United States Patent [19]

Smit

[11] 4,307,421

[45] Dec. 22, 1981

[54] TELEVISION CIRCUIT FOR CHANGING AN INTERLACE FACTOR

[75] Inventor: Hilbrand J. Smit, Eindhoven, Netherlands

[73] Assignee: U.S. Philips Corporation, New York, N.Y.

[21] Appl. No.: 166,508

[22] Filed: Jul. 7, 1980

[30] Foreign Application Priority Data

Jul. 11, 1979 [NL] Netherlands ............... 7905405

[51] Int. Cl.³ ............... H04N 5/04; H04N 5/84
[52] U.S. Cl. ............... 358/152; 358/244
[58] Field of Search ............... 358/152, 140, 150, 244, 358/111; 340/724

[56] References Cited

U.S. PATENT DOCUMENTS 4,096,530  6/1978  Plugge et al. ............... 358/152
4,251,835  2/1981  Eriksen ............... 358/244

*Primary Examiner*—John C. Martin
*Attorney, Agent, or Firm*—Thomas A. Briody; William J. Streeter; Laurence A. Wright

[57] ABSTRACT

A television circuit for changing an interlace factor by a factor of two or an integral power thereof and by a factor of a half, respectively. The circuit comprises a frequency division circuit which, when the field synchronizing signal to be processed, is applied to it supplies a square-wave output signal as a gate signal, and signal channels each having a multivibrator circuit and a first and a second subsequent series-arranged coincidence gate. In two signal channels the field synchronizing signal is applied to the multivibrator circuit and to the second gate, a signal originating from an other signal channel being used for this purpose in further signal channels.

4 Claims, 2 Drawing Figures

TELEVISION CIRCUIT FOR CHANGING AN INTERLACE FACTOR

TITLE OF THE INVENTION

The invention relates to a television circuit for changing an interlace factor.

BACKGROUND OF THE INVENTION

A circuit for, for example, increasing the interlace factor from non-interlace with the ratio 1:1 to a single interlace with the ratio 2:1 and multi interlace with the ratios 3:1, 4:1 etc. can be realised by grouping television line rasters in groups of two, three, four rasters etc; for the ratio 2:1 the field synchronizing pulse edge which effects a trigger action is shifted half a line period in the second raster, for the ratio 3:1 the trigger pulse edge is shifted in the second and third rasters, respectively, one-third and two-thirds line period, respectively, for the ratio 4:1 a trigger pulse edge is shifted one-fourth, one-half and three-fourths line period, etc. When no interlace is effected, a displayed picture consists of one sole line raster and for the ratios 2:1, 3:1, 4:1 etc. two, three, four etc. interlaced line rasters make a picture.

Single interlace with the ratio 2:1 is fixed in television standards which apply to public television broadcasting systems. This interlace is prescribed to minimize flicker of the displayed picture and to obtain an improved definition as compared with non-interlace.

For television-film (telecine), television-photograph and television-slide converting systems it is advantageous to use multi-interlace to reduce the perceptibility of the television line structure, for a line number per raster which is equal to or higher than the line number of the standards. When, for example, X-ray television pictures are photographed an interlace factor of 4:1 appears to improve the quality of the photograph to a considerable extent as compared with the ratio 2:1. Further, multi-interlace can be used with the above advantage when pictures are displayed by means of long-persistence display tubes.

The interlace factor can be increased by means of the said circuits for shifting trigger pulse edges in the field synchronizing signal. Such a pulse edge shift can be realized by means of delay devices in the form of, for example, delay lines, multivibrator circuits, pulse counting circuits, shift registers etc. Logic gates may be used for signal combination purposes. Even when the specific construction of the field synchronizing circuit with the changeable interlace factor is left out of consideration, the field synchronizing circuit will be of a complicated structure if no special measures are taken.

SUMMARY OF THE INVENTION

The invention has for its object to provide a field synchronizing circuit with a changeable interlace factor which is of a simple construction, for which purpose a certain choice will be made for a number of interlace factors to be adjusted, whereas it is also possible to make an interlace factor smaller. According to the invention, a television circuit for changing an interlace factor is therefore characterized in that the circuit is suitable for changing an interlace factor by a factor of two or an integral power thereof and by a factor of a half, respectively, and comprises a frequency division circuit which, when the field synchronizing signal to be processed is applied thereto, produces a square-wave output signal having a frequency equal to the field frequency divided by the interlace factor to be obtained, and at least a signal channel comprising a multivibrator circuit which, when the field synchronizing signal to be processed is applied thereto, produces a pulse-shaped signal having a pulse duration equal to one line period divided by the interlace factor to be obtained, a first coincidence gate, a first and a second input of which are connected to outputs of the frequency division circuit and the multivibrator circuit and the output of which is connected to a first input of a second coincidence gate provided in the signal channel and having a second input for receiving the field synchronizing signal to be processed and also having an output connected to the output of the television circuit.

A simple construction of the television circuit which, when it receives a field synchronizing signal corresponding to an interlace factor equal to 2:1, can supply a processed field synchronizing signal corresponding with an interlace factor equal to 4:1, is characterized in that the circuit comprises two signal channels, each channel comprising a multivibrator circuit and a first and a second coincidence gate, the first inputs of the first coincidence gates being connected to outputs of the sole frequency division circuit.

A further embodiment which can supply a field synchronizing signal corresponding with an interlace factor equal to 8:1, 16:1 etc. is characterized in that the circuit comprises at least a further signal channel comprising a multivibrator circuit and a first and a second coincidence gate, the input of the multivibrator circuit and the second input of the second coincidence gate being coupled to the output of the second coincidence gate in that further signal channel including the multivibrator for supplying the pulse-shaped signal having the shortest pulse duration.

Changing the interlace factor can be effected in a simple way in a circuit which is characterized in that the signal channels are connected to the output of the circuit by way of a change-over switch.

It has been accomplished that when a field synchronizing signal is applied which is associated with a line raster which is not interlaced or is interlaced, a field synchronizing signal can be obtained which produces a single or a multi-interlaced line raster. When a field synchronizing signal is applied which is associated with a line raster having an interlace factor equal to 2:1 or 4:1, the circuit can produce a field synchronizing signal which is associated with a non-interlaced line raster or a single interlaced line raster, in the ratio 2:1, it being possible in the latter case to use recording and display apparatus as prescribed in the standards and which are suitable for television broadcasting.

BRIEF DESCRIPTION OF THE DRAWINGS

The invention will now be further described by way of non-limitative example with reference to the accompanying drawings, in which.

DESCRIPTION OF THE PREFERRED EMBODIMENTS

Figure 1:
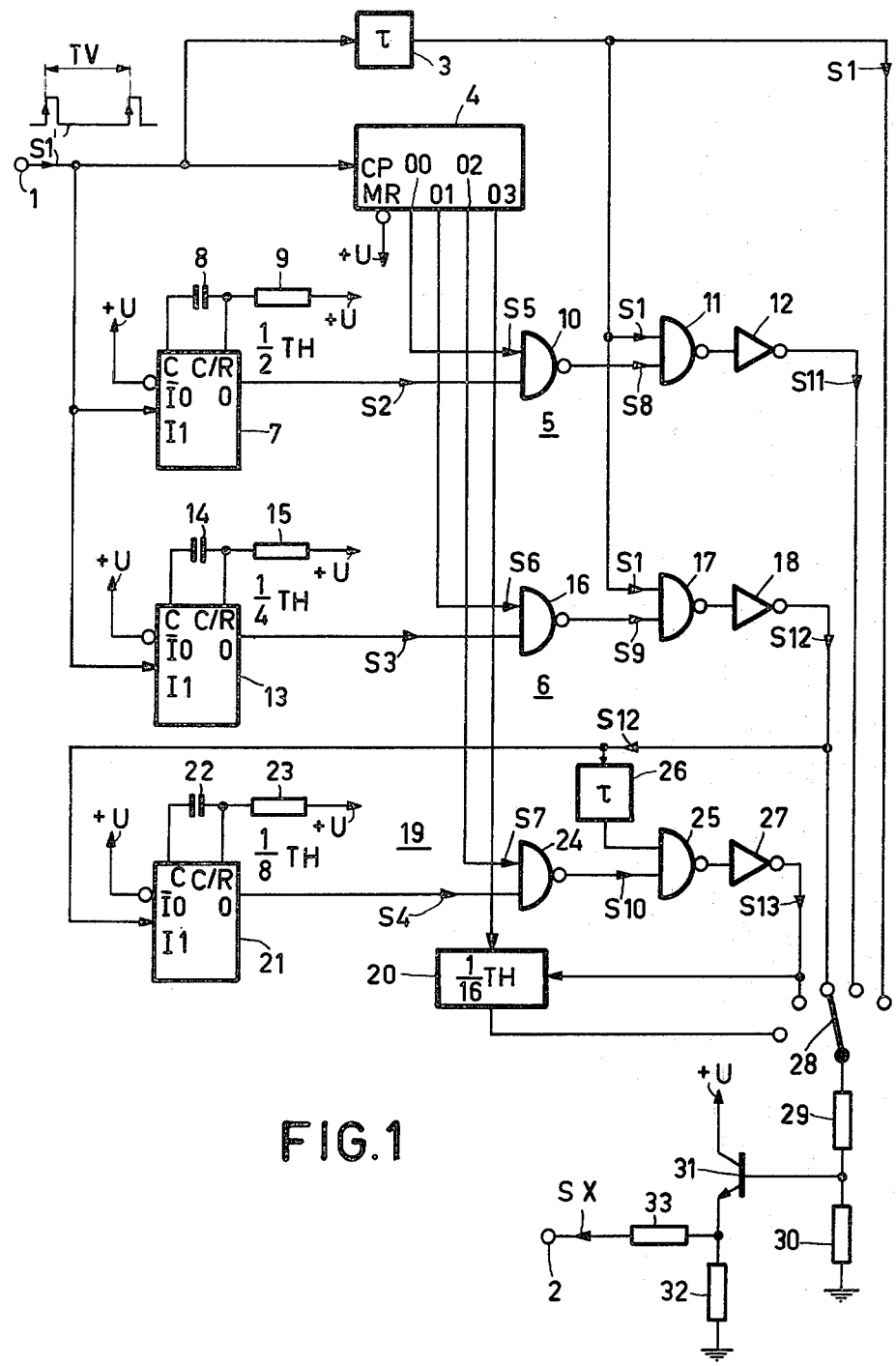
FIG. 1 shows an embodiment of the television circuit according to the invention.

Referring to FIG. 1, reference numeral 1 denotes an input carrying a signal S1' and reference numeral 2 denotes a circuit output, which carries a signal SX. The signal S1' applied to the input 1, is shown next to it as a function of the time. The signal S1' is a television field synchronizing signal which, in FIG. 1, is shown with acsending field pulses, in a field period TV. The leading edges of the field pulses are accurately fixed in the time and excercise a trigger action during the field synchronisation which, as will become apparent, also holds for the components of the circuit shown in FIG. 1. The trigger pulse edges are indicated by means of arrow tips in FIG. 1. For a description of how a field synchronizing pulse having trigger pulse edges which are accurately fixed in the time are derived from a composite synchronizing signal comprising line and field synchronizing pulses and pre-equalisation pulses and post-equalisation pulses, reference is made to Netherlands Patent Application No. 7 811 812.

The field synchronizing signal S1' is associated with a non-interlaced line raster when the field period TV comprises an integral number of lines. When a line period, not shown, is denoted by TH it holds, for example, that TV=312 TH. If the field period TV comprises a non-integral number of lines, interlace occurs in television recording and display. For, for example, TV=312½TH it follows that a displayed picture is assembled from two interlaced line rasters. This is associated with an interlace factor equal to 2:1. It likewise holds that, for TV=312¼TH, a picture is assembled from four interlaced line rasters with which an interlace factor equal to 4:1 is associated. In a similar manner, an interlace factor equal to 1:1 holds for a non-interlaced picture. The operation of the circuit shown in FIG. 1 will be described for the cases in which the signal S1' is associated with line rasters having an interlace factor equal to 1:1 (no interlace), 2:1 (interlaced in accordance with the standard) and 4:1 (non-standard television with reduced perceptibility of the line structure).

Figure 2:
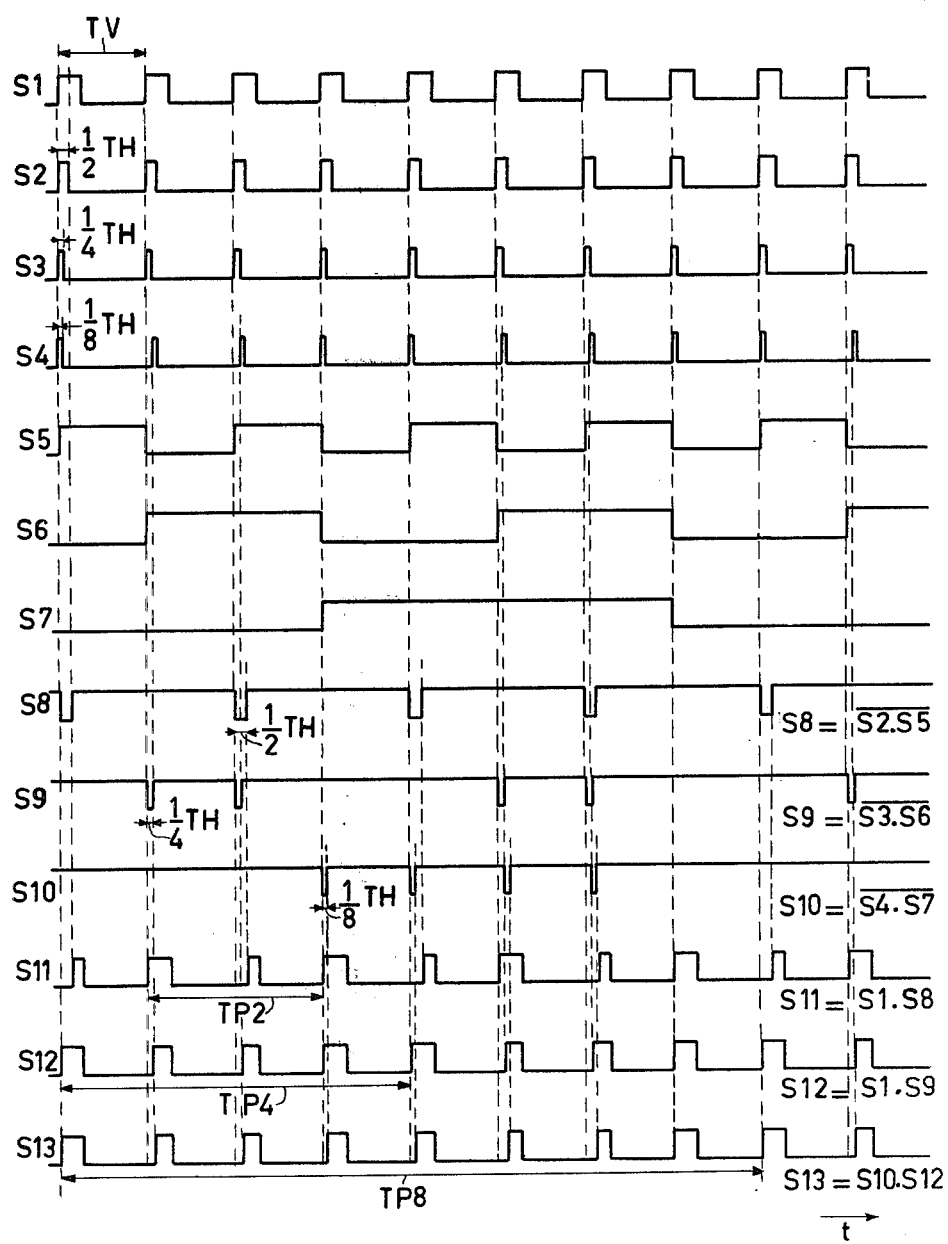
FIG. 2 shows some signals as a function of the time, to explain the operation of the circuit.

The input 1 is connected to an input of a delay device 3 at the output of which a signal S1 occurs, which is shown in FIG. 2 as a function of the time t. The device 3 has for its purpose to compensate for time delays ($\tau$)FIG. 1. Neglecting the delay, the signal S1 of FIG. 2 is identical to the signal S1' shown in FIG. 1. Furthermore, FIG. 2 shows signals S2, S3 to S13, inclusive, which are derived from the signal S1. The signals S1 to S13, inclusive, are shown schematically and not to scale. So it holds that, for the pulse durations TH/2, TH/4 and TH/8, wherein TH is equal to the line period, the ascending pulse in the signal S1 has a pulse duration of, for example 2½TH.

The input 1 is further connected to a clock pulse input CP of a frequency division circuit 4, which is implemented as a pulse counting circuit. The circuit 4 is, for example, in the form of a 4-bit synchronous binary counter of the "Philips" type HEF 40161 B. A master-resetting input MR of the circuit 4 is connected to a terminal which carries a voltage +U and which forms part of a voltage source, not shown, another terminal of which is connected to ground. The input MR is shown in the form of a circle to indicate an inverse polarity input. The circuit 4 comprises four outputs 00, 01, 02 and 03, the signals supplied by the first three outputs being denoted as S5, S6 and S7. From FIG. 2 it appears that the frequency division circuit 4 supplies, when the field synchronizing signal S1' is applied to it, square-wave output signal S5, S6 and S7 with ½, ¼ and ⅛ time the field frequency, respectively.

In addition, the input 1 is connected to two signal channels 5 and 6. The signal channel 5 comprises a multivibrator circuit 7 a triggering input I1 of which is connected to the input 1. The circuit 7 is, for example, part of a dual monostable multivibrator of the "Philips" type HEF 4528 B. A second, inverse triggering input $\overline{I0}$ of this type is connected to a terminal having the voltage +U. Two connecting points of the circuit 7, denoted by C and C/R, are connected to the terminals of a capacitor 8, the connecting point C/R being connected, by way of a resistor 9 to a terminal which carries the voltage +U. The capacitor 8 and the resistor 9 determine the duration of a pulse present at an outout 0 after the occurrence of an ascending trigger pulse edge in the signal S1'. Let it be assumed that the circuit 7 supplies pulses having a duration equal to ½TH, which results in the signal S2 shown in FIG. 2. Alternatively, the circuit 7 may be of a construction different from the construction as a monostable multivibrator circuit.

The signal channel 5 further comprises a first coincidence gate 10, which is constructed as a NAND-gate and a first input of which is connected to the output 00 of the circuit 4 and a second input to the output 0 of the circuit 7. The output of the gate 10, which carries the signal S8 is connected to a first input of a second coincidence gate 11, which is constructed as a NAND-gate and a second input of which is connected to the output of the delay device 3. The output of the gate 11 is connected to the input of an inverter 12, which supplies the signal S11 at its output. The signal S8 is formed from the signals S2 and S5 via the logic gate 10 so that it holds that: $S8 = \overline{S2 \cdot S5}$. The logic gate 11 and the inverter 12 result in the signal S11, for which it holds that: $S11 = S1 \cdot S8$.

In like manner the signal channel 6 is formed by a multivibrator circuit 13 and a capacitor 14 and resistor 15, connected thereto. The circuit 13 supplies pulses having a duration equal to $\theta$TH. The output 0 which carries the signal S3 of the circuit 13, is connected to an input of a first gate 16, an other input of which is connected to the output 01 of the circuit 4, which carries the signal S6. The output, which carries the signal S9, of the gate 16 is connected to an input of a second gate 17, which is followed by an inverter 18 carrying the output signal S12, whereas the other input is connected to the device 3. From the logic equation $S9 = \overline{S3 \cdot S6}$ it follows that $S12 = S1 \cdot S9$.

The circuit shown in FIG. 1 further comprises two identical signal channels 19 and 20, the signal channel 19 being shown in detail. In the manner described for the signal channels 5 and 6, the signal channel 19 comprises a multivibrator circuit 21 having a capacitor 22 and resistor 23 connected thereto, the difference with respect to the signal supply in the signal channels 5 and 6 being that the trigger input I1 of the circuit 21 receives the signal S12. The circuit 21 is arranged for supplying pulses having a duration equal to ⅛TH, so that the output 0 supplies the signal shown in FIG. 2, this signal being derived from the signal S12. The signal channel 19 comprises a first gate 24 to which the signal S4 at the output 0 of the circuit 21 and the signal S7 at the output 02 of the circuit 4 are applied. The output, carrying the signal S10, of the gate 24, is connected to an input of a second gate 25, a further input of which is supplied with the signal S12 via a delay device 26, this in contrast with the signal supply to the second gates 11 and 17 in the signal channels 5 and 6, respectively. The delay device 26 has for its purpose to compensate for the propagation time delays in the circuits 4 and 21 and the gate 24, this time delay $\tau$ being neglected in the further course of this description. The output of the gate 25 is followed by an inverter 27 which produces the signal S13. By means of the logic equation $S10=\overline{S4\cdot S12}$ it follows that $S13=S10\cdot S12$.

FIG. 1 shows the signal channel 20 by means of one single block. 1/16TH indicates the pulse duration of the multivibrator circuit provided therein to which the signal S13 is applied, whereas furthermore the signal at the output 03 of the circuit 4 is applied to the signal channel 20. The output of the signal channel 20 carries a signal, not further shown, which may be used as the signals S12 and S13 in a signal channel, not shown, which is similar to the signal channels 19 and 20.

The outputs of the device 3, of the inverters 12, 18 and 27 and of the signal channel 20 are connected to selection contacts of a change-over switch 28. The switching arm contact of this change-over switch 28 is connected to ground by way of the series arrangement of two resistors 29 and 30. The connecting point of the resistors 29 and 30 is connected to the base of an npn transistor 31, whose collector is connected to a terminal which carries the voltage $+V$, and the emitter is connected to ground and to output 2 of the circuit, shown in FIG. 1 respectively, by way of a resistor 32 and 33, respectively. Via the change-over switch 28 and the transistor 31, which is connected as an emitter follower, the output signal SX represents one of the signals S1, S11, S12 and S13 or the signal received from the signal channel 20.

The operation of the circuit shown in FIG. 1 will now be further described with reference to FIG. 2, the signals S1' and S1, respectively, representing three different signals. In the first case the signal S1' represents a field synchronizing signal associated with non-interlaced line rasters. An integral number of lines is present in the field periods TV, it holding, for example, that $TV=312TH$. On display, a picture is formed in each field period TV and the interlace factor is equal to 1:1. In the second case the signal S1' represents a field synchronizing signal associated with two interlaced line rasters, that is to say the signal S1' is associated with a television standard. It holds, for example, that $TV=312\frac{1}{2}TH$. The interlace factor is equal to 2:1 and on display a picture is formed in two field periods TV, with 625 lines. In the third case the signal S1' represents a field synchronizing signal associated with four interlaced line rasters. It then holds, for example, that $TV=312\frac{1}{4}TH$. The interlace factor is equal to 4:1 and, on display, a picture is formed in four field periods, with 1250 lines.

In the first case the switching arm of the change-over switch 28 is connected to the selection contact carrying the signal S11, that is to say the signal channel 5 is connected to the output 2, so that the output signal SX corresponds with the signal S11. From the signal S11 shown in FIG. 2 it follows that the field pulses originating from the signal S1 are divided into two groups, as, by means of the signal S8, the leading edge of every other field pulse is delayed for a period of time $\frac{1}{2}TH$. Assuming that VV is equal to 312TH at the signal S1, the result is that in the signal S11 one field contains $312\frac{1}{2}$ lines and the other field $311\frac{1}{2}$ lines. Thus, the line rasters are grouped into two groups, two consecutive line rasters forming an interlaced picture on display, TP2 denotes a frame period. It appears that shifting the trigger pulse leading edges causes the signal S11 to belong to interlaced line rasters having an interlace factor equal to 2:1.

In the second case, as shown in FIG. 1, the switching arm of the change-over switch 28 is in the first instance connected to the signal channel 6, as a result of which the output signal SX corresponds with the signal S12. Let it be assumed that it holds for the signal S1 that $TV=312\frac{1}{2}TH$. Then, a first field of an interlaced picture with the interlace factor 2:1 starts at the beginning of a line, whereas the second raster starts halfway a line. For the pulse edges of the ascending pulses in the signal S1 it therefore holds, alternately: the field starts at the beginning of a line ($=OTH$) and the field starts halfway a line ($=\frac{1}{2}TH$). It now follows for the signal S12 of FIG. 2 that, in response to the descending pulses in the signal S9, each time two consecutive trigger pulse edges have been shifted for a period of time of $\frac{1}{4}TH$, separated by two unaffected field pulses. As a result thereof the field pulses in the signal S12 are grouped into groups of four, and TP4 denotes a group. Let it be assumed that for the four corresponding pulses in the signal S1 it holds that: the field starts at OTH, $\frac{1}{2}TH$, OTH, $\frac{1}{2}TH$. It then follows that shifting the pulse edge results in that: the raster starts at OTH, $\frac{1}{2}+\frac{1}{4}TH$, $0+\frac{1}{4}TH$, $\frac{1}{2}TH$. It appears that the signal S12 is associated with four interlaced line rasters starting, one after the other, in a line period TH at the instants OTH, $\frac{3}{4}TH$, $\frac{1}{4}TH$, $\frac{1}{2}TH$. Thus, a field synchronizing signal S12, which is associated with a double interlaced picture with the interlace factor 4:1, is derived from the applied field synchronizing signal S1' which is associated with a single interlaced picture with the interlace factor 2:1.

In the second case, the switching arm of the change-over switch 28 may be advantageously positioned on the selection contact on which the signal S13 is present. In addition to the pulse leading edge shifts effected already in the signal S12, the signal S10 causes further shifts for a period of time equal to $\frac{1}{8}TH$. Four shifts are then alternately effected and not effected, which results in a frame period TP8 as, starting from the eight corresponding pulses in the signal S1 in which the field starts at OTH, $\frac{1}{2}TH$, OTH, $\frac{1}{2}TH$ etc., and the sequence, derived therefrom for the signal S12, wherein the field starts at OTH, $\frac{3}{4}TH$, $\frac{1}{4}TH$, $\frac{1}{2}TH$, OTH, $\frac{3}{4}TH$, $\frac{1}{4}TH$, $\frac{1}{2}TH$, there follows for the signal S13 a sequence in which the fields start at OTH, $\frac{3}{4}TH$, $\frac{1}{4}TH$, $\frac{1}{2}+\frac{1}{8}TH$, $0\frac{1}{8}TH$, $\frac{3}{4}+\frac{1}{8}TH$, $\frac{1}{4}+\frac{1}{8}TH$. It appears that the signal S13 is associated with eight interlaced line rasters which, in a line period TH, start, one after the other, at the instants: OTH, 6/8TH, 2/8TH, $\frac{5}{8}TH$, $\frac{1}{8}TH$, $\frac{7}{8}TH$, $\frac{3}{8}TH$, and 4/8TH. Thus, a field synchronizing signal S13, associated with a fourfold interlaced picture with the interlace factor 8:1 is derived from the applied field synchronizing signal S1', which is associated with a single interlaced picture with the interlace factor 2:1.

Connecting the signal channel 20 to the output 2 by means of the change-over switch 28 results, in the manner described for the signal channel 19, that an eightfold interlaced picture having the interlace factor 16:1 is obtained.

Connecting the signal channel 5 with the signal S11 to the output 2, by means of the change-over switch 28, results in the described second case in that the interlace with the ratio 2:1 is canceled. Starting from a field start in the pulses in the signal S1 in accordance with the sequence OTH, $\frac{1}{2}TH$, OTH, $\frac{1}{2}TH$ etc. and a pulse leading edge shift by means of the signal S8 in accordance with $\frac{1}{2}TH$, OTH, $\frac{1}{2}TH$, OTH etc. it follows for the signal S11 that a field always starts at $\frac{1}{2}TH$. The result is a non-interlaced picture.

In the third case, wherein a field synchronizing signal S1' associated with a double interlaced picture with the interlace factor 4:1 is applied, the signal channel 5 may be advantageously through-connected to the output 2 by way of the change-over switch 28. Starting from a field which starts in accordance with the sequence OTH, ¾TH, ¼TH, ½TH for the four interlaced line rasters and a pulse leading edge shift by the signal S8 in accordance with ½TH, OTH, ½TH, OTH, there follows for the signal S11 a field start in accordance with the sequence ¼TH, ¾TH, ¾TH, ¼TH. It appears that a single interlaced picture with the interlace factor 2:1 is obtained. In this way, when a field synchronizing signal associated with a double interlaced television system is supplied, a field synchronizing signal associated with single interlace can be obtained, so that standard equipment may be used on recording and display.

It appears that the circuit shown in FIG. 1 is suitable for changing an interlace factor by a factor of two or an integral thereof, and by a factor of a half, respectively.

It should be noted that applying the signal S11 instead of the signal S1', to the signal channel 6, for the described first case in which the signal S1' represents a field synchronizing signal which is associated with noninterlaced fields, results in that the signal channel 6, 19 and 20, respectively, supplies a field synchronizing signal which is associated with a double, fourfold and eightfold interlaced picture with the interlace factors 4:1, 8:1 and 16:1, respectively. All this is a direct result of the foregoing description of the signal channels 19 and 20, to which the signals S12 and S13, respectively, are applied.

What is claimed is:

1. A television circuit for changing an interlace factor, the circuit comprising an input for receiving a field synchronizing signal to be processed which, on recording and display, is associated with line rasters which are interlaced or not interlaced, and an output for supplying a processed field synchronizing signal which, on recording and display, is associated with line rasters which which are not interlaced or interlaced differently, the television circuit comprising circuits for periodically shifting triggering pulse edges in the field synchronizing signal to be processed, characterized in that the circuit is suitable for changing an interlace factor by a factor of two or an integral power thereof and by a factor of a half, respectively, and comprises a frequency division circuit which, when the field synchronizing signal to be processed is applied thereto, produces a square-wave output signal having a frequency equal to the field frequency divided by the interlace factor to be obtained, and at least a signal channel comprising a multivibrator circuit which, when the field synchronizing signal is applied thereto, produces a pulse-shaped signal having a pulse duration equal to one line period divided by the interlace factor to be obtained, a first coincidence gate, a first and a second input of which are connected to outputs of the frequency division circuit and the multivibrator circuit and the output of which is connected to a first input of a second coincidence gate provided in the signal channel and having a second input for receiving the field synchronizing signal to be processed and also having an output connected to the output of the television circuit.

2. A television circuit as claimed in claim 1, characterized in that the circuit comprises two signal channels, each channel comprising a multivibrator circuit and a first and a second coincidence gate, the multivibrators providing pulses of different durations, the first inputs of the first coincidence gates being connected to outputs of the sole frequency division circuit.

3. A television circuit as claimed in claim 2, characterized in that the circuit comprises at least a further signal channel comprising a multivibrator circuit and a first and a second coincidence gate, the input of the multivibrator circuit and the second input of the second coincidence gate being coupled to the output of the second coincidence gate of one of said two signal channels for supplying the pulse-shaped signal having the shortest pulse duration.

4. A television circuit as claimed in claim 2 or 3, characterized in that the signal channels are connected to the output of the circuit by way of a change-over switch.

* * * * *